US 6,618,592 B1

(12) United States Patent
Vilander et al.

(10) Patent No.: US 6,618,592 B1
(45) Date of Patent: Sep. 9, 2003

(54) MOBILE INTERNET ACCESS

(75) Inventors: Harri Tapani Vilander, Espoo (FI); Tom Mikael Nordman, Kirkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/534,115

(22) Filed: Mar. 23, 2000

(30) Foreign Application Priority Data

Mar. 31, 1999  (GB) .............................................. 9907336

(51) Int. Cl.⁷ ................................................ H04Q 7/20
(52) U.S. Cl. ...................... 455/452; 455/414; 455/445; 370/351; 370/475
(58) Field of Search ................................ 455/414, 435, 455/445, 450, 451, 452; 370/252, 351, 392, 409, 475

(56) References Cited

U.S. PATENT DOCUMENTS

| | | |
|---|---|---|
| 5,854,901 A | 12/1998 | Cole et al. |
| 6,011,782 A * | 1/2000 | DeSimone et al. ......... 370/252 |
| 6,208,649 B1 * | 3/2001 | Kloth .......................... 370/392 |
| 6,230,012 B1 * | 5/2001 | Willkie et al. ............... 455/435 |
| 6,359,879 B1 * | 3/2002 | Carvey et al. ............... 370/351 |

FOREIGN PATENT DOCUMENTS

| | | | |
|---|---|---|---|
| EP | 0 578 041 A2 | 1/1994 | |
| GB | 2350970 A | * 12/2000 | ............ H04Q/7/22 |
| WO | 98/32303 | 7/1998 | |

OTHER PUBLICATIONS

Cohen et al, "IP Addressing and Routing in a Local Wireless Network", Proceedings of the Conference on Computer Communications (INFOCOM), US, New York, IEEE, vol. Conf. 11, 1992, pp. 626–632.

Ioannidis et al, "IP–Based Protocols for Mobile Internetworking", Computer Communications Review, Association for Computing Machinery, New York, US, vol. 21, nr. 4, pp. 235–245.

Patent Abstracts of Japan, vol. 1998, No. 04, Mar. 31, 1998 & JP 09 327076 A (Toshiba Corp), Dec. 16, 1997.

* cited by examiner

*Primary Examiner*—Quochien Vuong
(74) *Attorney, Agent, or Firm*—Nixon & Vanderhye, P.C.

(57) ABSTRACT

A method of allocating an Internet Protocol (IP) address to a mobile wireless terminal 7 within a mobile telecommunications network. The network repeatedly broadcasts, over a radio broadcast channel of the network, a routing prefix corresponding to the Radio Network Controller (RNC) ID. Mobile terminals 7 listen to the broadcast channel, either when registering with the network or subsequently thereto, to determine the routing prefix. A mobile terminal 7 combines the routing prefix with a host port to generate an IP address for subsequent Internet sessions.

7 Claims, 3 Drawing Sheets

MOBILE INTERNET ACCESS

FIELD OF THE INVENTION

The present invention relates to mobile Internet access and is applicable in particular, though not necessarily, to mobile Internet access achieved directly from the radio network of a mobile telecommunications network.

BACKGROUND TO THE INVENTION

Subscribers to existing mobile telecommunications networks may under certain circumstances access the Internet using either an Internet enabled mobile telephone (a device often referred to as a "communicator") or by coupling a palmtop or laptop computer to a conventional mobile telephone, for example using a software or hardware modem.

In digital mobile telephone networks, such as the European GSM (Global System for Mobile communications) system, a mobile telecommunications network can be divided into two parts. The first part is referred to as the "radio network" and consists of base stations (BSs) and base station controllers (BSCs) where a single BSC controls a number of BSs. The second part of the network is referred to as the "core network" and comprises mobile switching centres (MSCs), each MSC being responsible for a number of BSCs. An MSC is analogous to an exchange of a conventional telephone network. Internet traffic is carried over a circuit switched connection established between the mobile terminal and an Internet Service Provider (ISP) via the core network.

The development of future mobile communication standards is currently ongoing. In particular, an enhancement to GSM known as General Packet Radio Service (GPRS) is being developed to introduce a packet switched service into GSM. The introduction of GPRS will effectively add an additional core network to GSM systems, with switching functions being performed in the GPRS core network by Serving GPRS Support Nodes (SGSNs) and Gateway GPRS Support Nodes (GGSNs). A third generation digital system is also under development and is known as Universal Mobile Telecommunications System (UMTS). UMTS is likely to incorporate GPRS or a similar packet switched system.

Under current proposals, in both GSM GPRS and UNMTS systems, Internet access will be obtained via the packet switched core network. When a mobile terminal requests Internet access, the request is directed via a BS and a Radio Network Controller (RNC, equivalent to the traditional BSC) to a GGSN. The GGSN in turn directs the request to an Internet Access Server (IAS). The IAS is typically operated by an Internet Service Provider (ISP) which is independent from the operator of the mobile network. However, the IAS may alternatively be operated by the mobile network operator. In either case, the IAS allocates to the calling mobile terminal an Internet Protocol (IP) address. According to the existing Internet Protocol version 4 (IPv4), the IP address has 32 bits. According to the proposed Internet Protocol version 6 (IPv6), the IP address is enlarged to 128 bits and comprises a 64 bit routing prefix which uniquely identifies the IAS to the Internet, and also a 64 bit host prefix which uniquely identifies the mobile terminal to the IAS.

The allocated IP address is returned to the mobile terminal via the packet switched core network and the radio network whereupon the mobile terminal is able to commence an Internet session. Assuming that the mobile terminal is registered with its home network when the Internet access is requested, the Internet session is routed via the GGSN of the home network. However, when a mobile terminal is "roaming" and is registered with a foreign network, the Internet session may be conducted via both an SGSN of the visited network and possibly a GGSN of the home or foreign network.

As subscribers of existing digital networks may be aware, Internet access via a mobile terminal is generally extremely slow and unreliable. This is due in part to the need for a slow set-up phase, required each time a new transfer session is commenced, during which session parameters including an IP address are negotiated. Another reason for slow speed (as well as unreliability) is the possibly large distance between the node (e.g. IAS) which allocates an IP address and the mobile terminal, possibly involving one or more intermediate nodes. IP datagrams must be tunnelled between the two end points, often involving additional protocols (e.g. Point-to Point Protocol, Layer 2 Tunnelling Protocol, etc), consuming extra processing and transmission capacity.

Whilst the current proposals for GPRS and UMTS will result in a faster and more reliable radio connection between a mobile terminal and the radio and core networks, they will not eliminate the need to negotiate the IP address prior to commencing an Internet session nor the need to route IP datagrams via one or more switching nodes of the packet switched core network(s).

SUMMARY OF THE PRESENT INVENTION

It is an object of the present invention to overcome or at least mitigate the above noted disadvantages of existing and currently proposed mobile telecommunications networks. In particular, it is an object of the present invention to eliminate or at least obviate the need to negotiate an IP address between a mobile terminal and an node of the mobile network prior to commencing an Internet session.

According to a first aspect of the present invention there is provided a method of allocating an Internet protocol (IP) address to a mobile wireless terminal within a mobile telecommunications network, the method comprising repeatedly broadcasting at least a routing prefix over a radio channel of the network, wherein the routing prefix may be received by a mobile terminal listening to said broadcast and thereafter incorporated into an IP address.

Embodiments of the present invention enable a mobile terminal to be provided with a routing prefix prior to the mobile terminal commencing an Internet session. The mobile terminal may therefore in turn generate an IP address prior to such commencement.

The routing prefix transmitted by the mobile network may be unique to the radio network. Alternatively, the broadcast routing prefix may be unique to a node of the radio network, such as a Base Station Controller (BSC) of a GSM network or a Radio Network Controller (RNC) of a UMTS network. These possibilities allow the radio network/Radio Network Controller to be connected directly to the Internet and avoid the need to route a subsequent Internet session via an MSC/GGSN or analogous node of a core network.

Preferably, the mobile telecommunications network uses the GPRS or UMTS protocols over the air interface coupling mobile terminals to the network. Alternatively, a conventional digital protocol such as GSM or PDC may be used. The invention is also applicable to local mobile networks such as the proposed Broadband Radio Networks (BRANs) and networks utilising Bluetooth.

Preferably, said routing prefix is broadcast over a broadcast channel of the mobile network. Alternatively however, the routing prefix may be broadcast using a so-called multi-cast radio channel.

According to a second aspect of the present invention there is provided apparatus for allocating an Internet Protocol (IP) address to a mobile wireless terminal within a telecommunications network, the apparatus comprising means for continuously broadcasting at least a routing prefix of an IP address over the air interface of the telecommunications network, and means associated with the mobile terminal for listening to said broadcasts to obtain the routing prefix and for generating an IP address using the routing prefix.

According to a third aspect of the present invention there is provided an Internet enabled mobile wireless terminal, the mobile terminal being arranged in use to listen to a radio channel of a mobile telecommunications network and to obtain from the radio channel a broadcast routing prefix which can be used by the mobile terminal to generate an IP address.

BRIEF DESCRIPTION OF THE DRAWINGS

For better understanding of the present invention and in order to show how the same may be carried into effect reference will now be made, by way of example, to the accompanying drawings, in which.

DETAILED DESCRIPTION OF CERTAIN EMBODIMENTS

Figure 1:
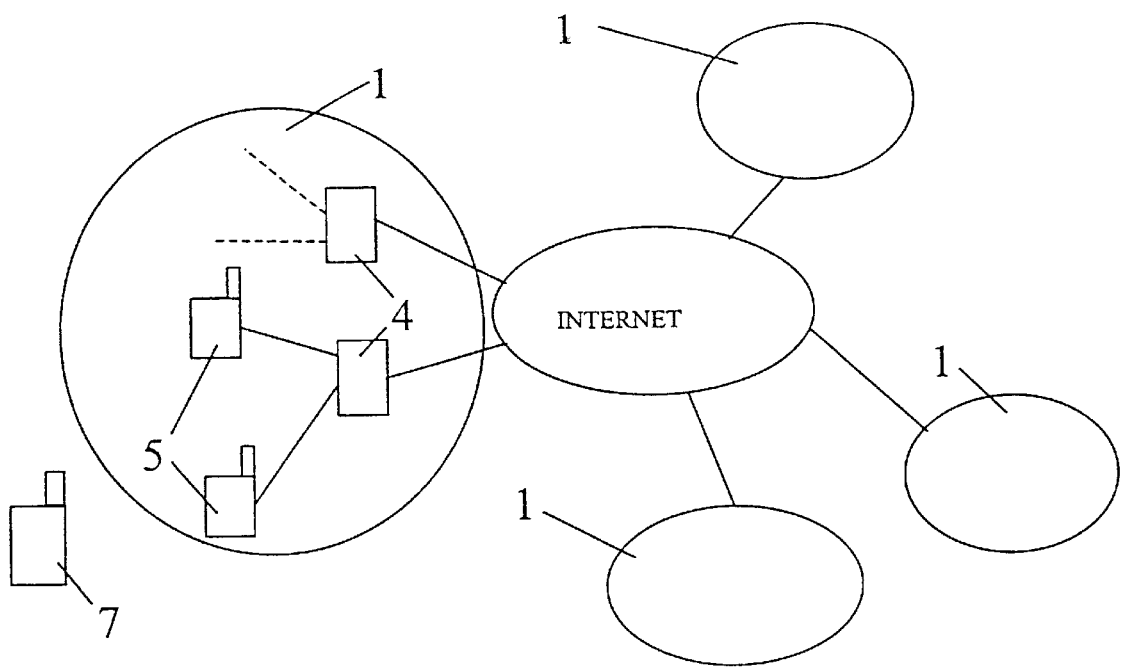
FIG. 1 illustrates schematically an Internet access method in a mobile telecommunications system.

A UMTS based telecommunication system incorporating the proposed General Packet Radio Service (GPRS) is illustrated schematically in FIG. 1 and comprises a number of radio networks 1 which may or may not have overlapping radio coverage. Each radio network 1 has its own unique radio network identity (ID1 to ID4) and comprises a plurality of Radio Network Controllers (RNCs) 4, each RNC4 being responsible in turn for a plurality of Base Stations (BSs) 5. Each RNC 4 effectively comprises an integrated IAS (or the functionality thereof), which enables the RNCs 4 to be coupled directly to the Internet.

FIG. 1 illustrates a mobile terminal 7 which is located within a cell associated with a given radio network 1. When the mobile terminal 7 is switched on, or first enters the geographical area covered by the radio network 1, the terminal 7 begins scanning the broadcast channel(s) of that network 1. By listening to the broadcast information, the mobile terminal 7 is able to select a suitable network (if there are several networks available), to synchronise with the selected network, and to initiate layers of the radio link (namely the CDMA physical layer and the medium access control, radio link control, and radio resource control layers). Each RNC 4 of the radio network 1 broadcasts over a predefined broadcast channel an IP routing prefix which has previously been allocated to that RNC 4 and which is worldwide unique to the RNC 4. Typically, the routing prefix corresponds to the RNC ID or may be a combination of RNC ID and network ID. By listening to the broadcast channel, the mobile terminal 7 is able to identify the routing prefix of the controlling RNC 4 and is subsequently able to generate an IP address using the routing prefix.

Figure 2:
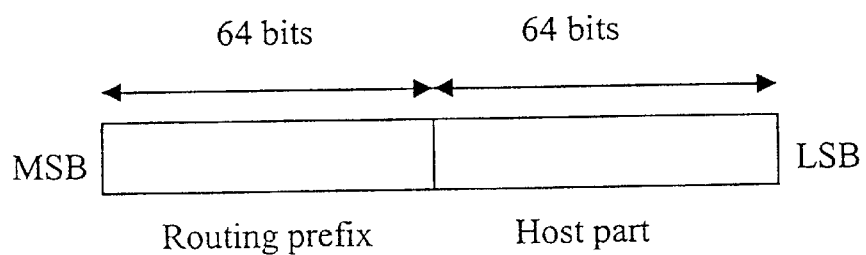
FIG. 2 illustrates the structure of an IP address.

FIG. 2 illustrates the structure of an IP address according to IPv6. The address comprises a 64 bit prefix (MSBs) containing the routing prefix. This prefix is used by routers in the Internet to route IP datagrams to the originating RNC 4. The second part of the address (LSBs) is also 64 bits in length, and represents a host part which uniquely identifies the originating mobile terminal 7 to the RNC 4.

There are a number of different ways in which the mobile terminal 7 may generate the host part of the EP address. For example, the host part may correspond to, or be associated with, the subscriber identity allocated to the mobile terminal 7 (or to the mobile subscriber). In any case, by combining the host part with the broadcast routing prefix, the mobile terminal 7 is able to generate a unique IP address. Once the address is generated by the terminal 7, the terminal 7 can immediately commence an Internet session via the radio network 1 and the controlling RNC 4.

Figure 3:
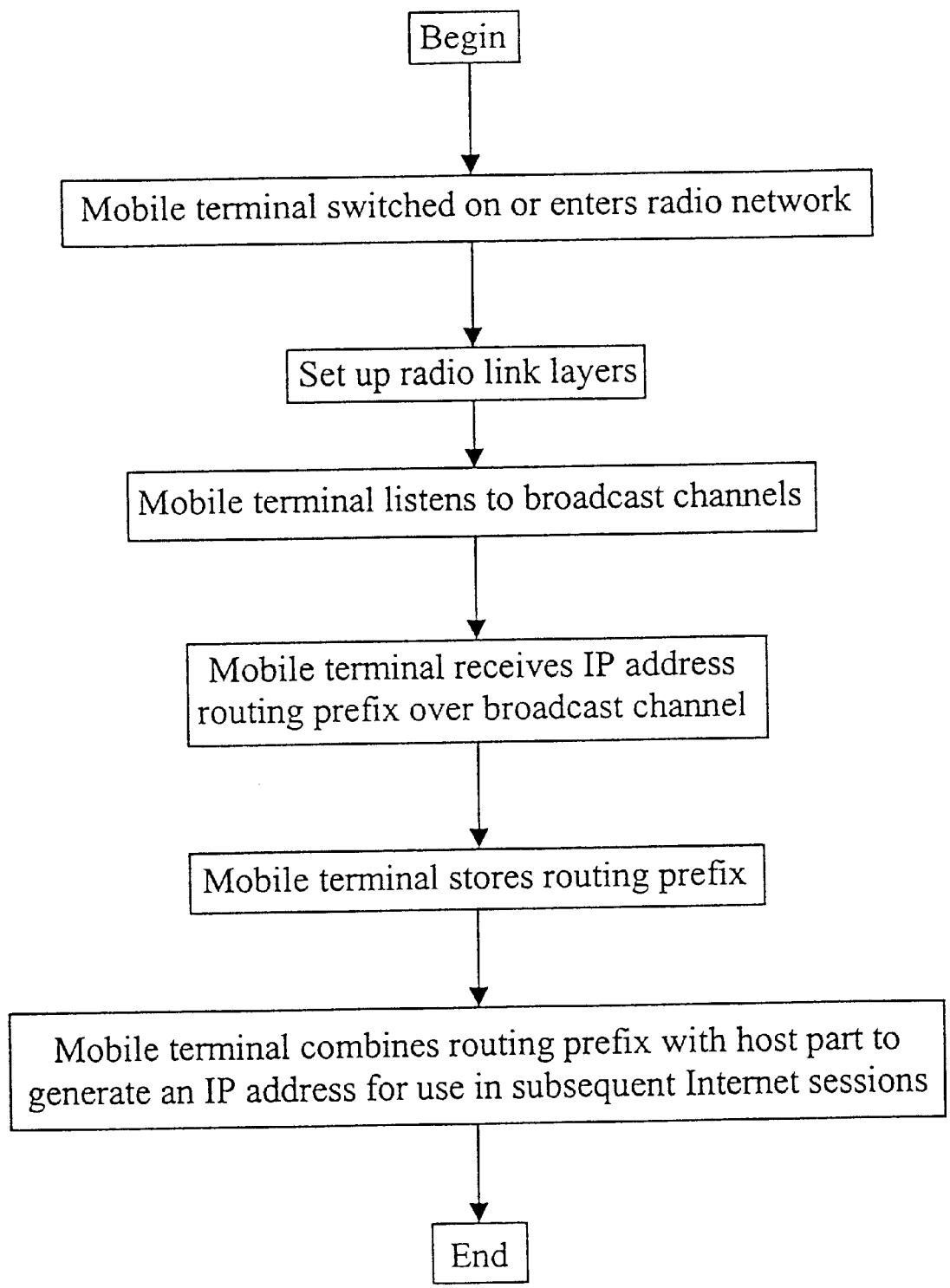
FIG. 3 is a flow diagram illustrating a method of generating IP addresses in the system of FIG. 1.

FIG. 3 is a flow diagram illustrating the method of allocating an IP address to a mobile terminal 7.

Figure 4:
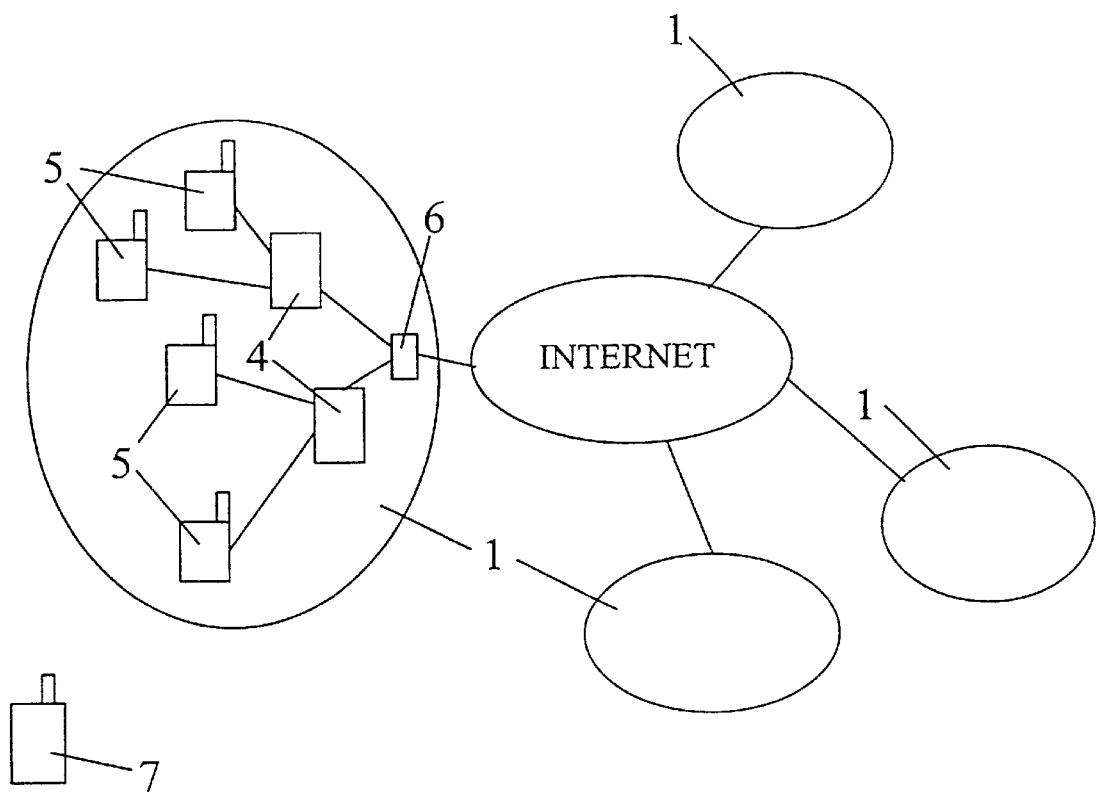
FIG. 4 illustrates schematically an alternative Internet access method in a telecommunications system.

FIG. 4 illustrates an alternative embodiment of the present invention where each RNC 4 of a radio network 1 is connected to the Internet via a common IAS 6. This configuration is somewhat disadvantageous as it lengthens the path between a mobile terminal 7 and the Internet, decreasing the speed of any Internet connection. This configuration requires however that the routing prefix be unique only to the radio network, e.g the routing prefix may correspond to the radio network ID.

It will be appreciated that when a mobile terminal 7 moves from one network to another network, the mobile terminal 7 must listen to the broadcast channel(s) of the new network to determine the routing prefix for subsequent Internet sessions. Tunnelling may be used to transmit IP datagrams, requested prior to the change of network, to the mobile terminal 7. Similarly, if the mobile terminal 7 moves within a given radio network such that the RNC 4 controlling the terminal 7 changes, the mobile terminal 7 must listen to the broadcast channel(s) to determine a new routing prefix or at least the node ID of the newly controlling RNC 4.

It will be appreciated by a person of skill in the art that various modifications may be made to the above described embodiments without departing from the scope of the present invention. For example, rather than use the radio network ID as the routing prefix (or to generate the routing prefix), another unique code may be assigned but which nonetheless is tied to the radio network. Similarly, where each RNC 4 is coupled directly to the Internet, some code other than the RNC node ID may be used (in combination with the radio network ID or associated code) to form the routing prefix.

What is claimed is:

1. A method of allocating an Internet protocol (IP) address to a mobile wireless terminal within a mobile telecommunications network, the method comprising repeatedly broadcasting at least a routing prefix over a radio channel of the network, wherein the routing prefix may be received by a mobile terminal listening to said radio channel and thereafter incorporated into an IP address.

2. A method according to claim 1, wherein the routing, prefix broadcast by the mobile network is unique to the radio network.

3. A method according to claim 1, wherein the broadcast routing prefix is unique to a node of the radio network, such as a Base Station Controller (BSC) of a GSM network or a Radio Network Controller (RNC) of a GPRS/UTS network.

4. A method according to claim 1, wherein the mobile telecommunications network uses GPRS or UMTS protocols over the air interface coupling mobile terminals to the network.

5. A method according to claim 1, wherein said routing prefix is transmitted over a broadcast channel of the mobile network.

6. Apparatus for allocating an Internet Protocol (IP) address to a mobile wireless terminal within a telecommunications network, the apparatus comprising means for continuously broadcasting at least a routing prefix of an IP address over the air interface of the telecommunications network, and means associated with the mobile terminal for listening to said broadcasts to obtain the routing prefix and for generating an IP address using the routing prefix.

7. An Internet enabled mobile wireless terminal, the mobile terminal being arranged in use to listen to a radio channel of a mobile telecommunications network and to obtain from the radio channel a broadcast routing prefix which can be used by the mobile terminal to generate an IP address.

* * * * *